(12) United States Patent
Wei et al.

(10) Patent No.: US 10,778,794 B2
(45) Date of Patent: *Sep. 15, 2020

(54) MODULAR TELECOMMUNICATION EDGE CLOUD SYSTEM

(71) Applicant: Futurewei Technologies, Inc., Plano, TX (US)

(72) Inventors: Wei Wei, Plano, TX (US); Jingjing Zhang, Plano, TX (US); Konstantinos Kanonakis, Dallas, TX (US)

(73) Assignee: Futurewei Technologies, Inc., Plano, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/057,427

(22) Filed: Aug. 7, 2018

(65) Prior Publication Data

US 2018/0367630 A1  Dec. 20, 2018

Related U.S. Application Data

(63) Continuation of application No. 15/182,290, filed on Jun. 14, 2016, now Pat. No. 10,063,666.

(51) Int. Cl.
*G06F 15/16* (2006.01)
*H04L 29/08* (2006.01)
(Continued)

(52) U.S. Cl.
CPC ............... *H04L 67/28* (2013.01); *G06F 9/00* (2013.01); *G06F 9/46* (2013.01)

(58) Field of Classification Search
USPC ........ 709/203, 202, 204, 224, 223, 234, 249
See application file for complete search history.

(56) References Cited

U.S. PATENT DOCUMENTS 6,317,438 B1 * 11/2001 Trebes, Jr. .......... H04L 12/2854
370/351
7,987,152 B1    7/2011 Gadir
(Continued)

FOREIGN PATENT DOCUMENTS

| CN | 102185926 A | 9/2011 |
| CN | 104270473 A | 1/2015 |
| WO | 2013175170 A1 | 11/2013 |

OTHER PUBLICATIONS

Al-Shabibi, Ali et al, "CORD Reference Implementation," CORD Design Notes, Mar. 14, 2016, 12 pages.
(Continued)

*Primary Examiner* — Jude Jean Gilles
(74) *Attorney, Agent, or Firm* — Conley Rose, P.C.

(57) ABSTRACT

A telecommunications edge cloud (TEC) element deployed between a client and a packet network includes a TEC hardware layer including storage resources, networking resources, and computing resources, wherein the computing resources include a plurality of processors. A TEC operating system (TECOS) is coupled to the TEC hardware layer and configured to control and manage the storage resources, the networking resources, and the computing resources, wherein the TECOS is executed by one of the processors, a TEC application layer coupled to the TECOS, wherein the TEC application layer is configured to process a request from the client using the TECOS, wherein the computing resources are configured to provide a service to the client when the request is a service request, and wherein at least one of the networking resources and the storage resources is configured to provide data to the client when the request comprises a data request.

20 Claims, 10 Drawing Sheets

(51) Int. Cl.
*G06F 9/46* (2006.01)
*G06F 9/00* (2006.01)
*H04L 29/06* (2006.01)
*H04L 12/24* (2006.01)

(56) References Cited

U.S. PATENT DOCUMENTS

| | | | |
|---|---|---|---|
| 8,352,941 | B1 | 1/2013 | Protopopov et al. |
| 8,472,728 | B1 | 6/2013 | Chau et al. |
| 8,644,188 | B1 | 2/2014 | Brandwine et al. |
| 8,849,976 | B2* | 9/2014 | Thibeault ............. G06F 9/5027 709/223 |
| 8,880,678 | B1 | 11/2014 | Colton et al. |
| 9,300,688 | B2* | 3/2016 | Morrison ................ G06F 21/53 |
| 9,356,883 | B1 | 5/2016 | Borthakur |
| 9,633,315 | B2 | 4/2017 | Chapelle et al. |
| 9,729,396 | B2 | 8/2017 | Rosa De Sousa Teixeira et al. |
| 9,733,985 | B2 | 8/2017 | Iyoob et al. |
| 9,804,867 | B2 | 10/2017 | Lee et al. |
| 9,832,205 | B2 | 11/2017 | Santhi et al. |
| 10,063,666 | B2* | 8/2018 | Wei .......................... G06F 9/46 |
| 10,079,877 | B2 | 9/2018 | Paramasivam |
| 10,135,678 | B2 | 11/2018 | Chakrabarti et al. |
| 10,148,493 | B1 | 12/2018 | Ennis, Jr. et al. |
| 10,212,030 | B2 | 2/2019 | Chakrabarti et al. |
| 10,348,767 | B1 | 7/2019 | Lee et al. |
| 2002/0009079 | A1 | 1/2002 | Jungck et al. |
| 2002/0023164 | A1 | 2/2002 | Lahr |
| 2004/0088389 | A1 | 5/2004 | Shah |
| 2005/0027870 | A1* | 2/2005 | Trebes, Jr. ............. H04B 1/715 709/227 |
| 2006/0123425 | A1* | 6/2006 | Ramarao ................. H04L 51/00 719/313 |
| 2006/0123479 | A1* | 6/2006 | Kumar ................ H04L 63/0245 726/23 |
| 2007/0168336 | A1 | 7/2007 | Ransil et al. |
| 2008/0309480 | A1 | 12/2008 | Youn et al. |
| 2011/0075667 | A1 | 3/2011 | Li et al. |
| 2011/0225299 | A1 | 9/2011 | Nathuji et al. |
| 2011/0258692 | A1 | 10/2011 | Morrison et al. |
| 2012/0131178 | A1* | 5/2012 | Zhu ..................... H04L 67/1002 709/224 |
| 2012/0195324 | A1 | 8/2012 | Raghuraman et al. |
| 2013/0044641 | A1 | 2/2013 | Koponen et al. |
| 2013/0227116 | A1 | 8/2013 | Radhakrishnan |
| 2013/0290223 | A1 | 10/2013 | Chapelle et al. |
| 2013/0346969 | A1 | 12/2013 | Shanmuganathan et al. |
| 2014/0067758 | A1 | 3/2014 | Boldyrev et al. |
| 2014/0173112 | A1 | 6/2014 | Seago et al. |
| 2014/0244844 | A1 | 8/2014 | Minakuchi et al. |
| 2014/0280480 | A1 | 9/2014 | Kazerani et al. |
| 2014/0280668 | A1 | 9/2014 | Brown et al. |
| 2014/0325068 | A1 | 10/2014 | Assuncao et al. |
| 2014/0376517 | A1 | 12/2014 | Geirhofer et al. |
| 2015/0019728 | A1 | 1/2015 | Suryanarayanan et al. |
| 2015/0052525 | A1 | 2/2015 | Raghu |
| 2015/0063166 | A1 | 3/2015 | Sif et al. |
| 2015/0067112 | A1 | 3/2015 | Gokhale et al. |
| 2015/0106805 | A1 | 4/2015 | Melander et al. |
| 2015/0149640 | A1 | 5/2015 | Douglas et al. |
| 2015/0169419 | A1 | 6/2015 | Carney et al. |
| 2015/0180992 | A1 | 6/2015 | Thibeault et al. |
| 2015/0263916 | A1 | 9/2015 | Phillips et al. |
| 2015/0334181 | A1 | 11/2015 | Jimenez et al. |
| 2016/0036837 | A1 | 2/2016 | Jain et al. |
| 2016/0044035 | A1 | 2/2016 | Huang |
| 2016/0057107 | A1 | 2/2016 | Call et al. |
| 2016/0065417 | A1 | 3/2016 | Sapuram et al. |
| 2016/0112475 | A1 | 4/2016 | Lawson et al. |
| 2016/0124742 | A1 | 5/2016 | Rangasamy et al. |
| 2016/0191673 | A1 | 6/2016 | Bohannon et al. |
| 2016/0212012 | A1 | 7/2016 | Young et al. |
| 2016/0285780 | A1 | 9/2016 | Strijkers et al. |
| 2016/0330083 | A1 | 11/2016 | Djukic et al. |
| 2016/0337175 | A1 | 11/2016 | Rao |
| 2016/0337919 | A1 | 11/2016 | Bindrim et al. |
| 2016/0380828 | A1 | 12/2016 | Mulligan et al. |
| 2016/0380886 | A1 | 12/2016 | Blair et al. |
| 2017/0026355 | A1 | 1/2017 | Mathaiyan et al. |
| 2017/0041296 | A1 | 2/2017 | Ford et al. |
| 2017/0078059 | A1 | 3/2017 | Sun et al. |
| 2017/0079059 | A1 | 3/2017 | Li et al. |
| 2017/0085628 | A1 | 3/2017 | Mahindra et al. |
| 2017/0142206 | A1 | 5/2017 | Kodaypak et al. |
| 2017/0199770 | A1 | 7/2017 | Peteva et al. |
| 2017/0214550 | A1 | 7/2017 | Kumar et al. |
| 2017/0230451 | A1 | 8/2017 | Paramasivam |
| 2017/0244787 | A1 | 8/2017 | Rangasamy et al. |
| 2017/0249374 | A1 | 8/2017 | Parees et al. |
| 2017/0250892 | A1 | 8/2017 | Cooper et al. |
| 2017/0272326 | A1 | 9/2017 | Ravindran et al. |
| 2017/0344968 | A1 | 11/2017 | Lientz et al. |
| 2017/0353348 | A1 | 12/2017 | Gunjal et al. |
| 2017/0359443 | A1 | 12/2017 | Wei et al. |
| 2017/0366428 | A1 | 12/2017 | Shaw et al. |
| 2017/0373940 | A1 | 12/2017 | Shahab et al. |
| 2018/0004561 | A1 | 1/2018 | Liguori et al. |
| 2018/0007059 | A1 | 1/2018 | Innes et al. |
| 2018/0041468 | A1 | 2/2018 | Miller et al. |
| 2018/0041578 | A1 | 2/2018 | Lee et al. |
| 2018/0041905 | A1 | 2/2018 | Ashrafi |
| 2018/0109959 | A1 | 4/2018 | Larsson et al. |
| 2018/0219735 | A1 | 8/2018 | Di-Cairano-Gilfedder et al. |
| 2018/0343567 | A1 | 11/2018 | Ashrafi |
| 2018/0351652 | A1 | 12/2018 | Ashrafi |
| 2018/0351824 | A1 | 12/2018 | Giust et al. |
| 2018/0359311 | A1 | 12/2018 | Paramasivam |
| 2018/0376338 | A1 | 12/2018 | Ashrafi |
| 2019/0014040 | A1 | 1/2019 | Yerrapureddy et al. |
| 2019/0158997 | A1 | 5/2019 | Starsinic et al. |

OTHER PUBLICATIONS

Machine Translation and Abstract of Chinese Publication No. CN104270473, Jan. 7, 2015, 8 pages.
Foreign Communication From A Counterpart Application, PCT Application No. PCT/CN2016/090317, English Translation of International Search Report dated Feb. 24, 2017, 4 pages.
"Introducing "6-pack": the first open hardware modular switch," retrieved from the internet: http://code.facebook.com/posts/717010588413497/introducing-6-pack-the-first-open-hardware-modular-switch/, Feb. 11, 2015, 9 pages.
Kosmos, "301 and 302 Web Page Redirects," Sep. 26, 2014, https://web.archive.org/web/20140926015145/https://kosmoscentral.com/so-articles/web-page-redirects, 3 pages.
Apache, "Class HttpGet," Nov. 29, 2010, https://web.archive.org/web/20101129013507/http://hc.apache.org/httpcomponents-client-ga/httpclient/apidocs/org/apache/http/client/methods/HttpGet.html, 3 pages.
Gupta, Platform Virtualization: Understanding Virtual Machines, LXC, Docker, Kubernetes, and Ubernetes, Jun. 2016, http://ijiet.com/wp-content/uploads/2016/06/65.pdf, pp. 442-447.
Kessaci, Y., "Multi-criteria Scheduling on Clouds," Dec. 6, 2013, https://tel.archives-ouvertes.fr/tel-00915043/document, 174 pages.
Machine Translation and Abstract of Chinese Publication No. CN102185926, Sep. 14, 2011, 12 pages.
Foreign Communication From a Counterpart Application, PCT Application No. PCT/CN2017/096506, English Translation of International Search Report dated Oct. 27, 2017, 7 pages.
Foreign Communication From a Counterpart Application, PCT Application No. PCT/CN2017/096506, English Translation of Written Opinion dated Oct. 27, 2017, 4 pages.
Office Action dated Mar. 22, 2018, 80 pages, U.S. Appl. No. 15/231,364, filed Aug. 8, 2016.
Office Action dated Aug. 15, 2019, 62 pages, U.S. Appl. No. 15/231,364, filed Aug. 8, 2016.
Notice of Allowance dated Feb. 22, 2018, 16 pages, U.S. Appl. No. 15/182,290, filed Jun. 14, 2016.

(56) References Cited

OTHER PUBLICATIONS

Notice of Allowance dated Apr. 11, 2018, 13 pages, U.S. Appl. No. 15/182,290, filed Jun. 14, 2016.

* cited by examiner

MODULAR TELECOMMUNICATION EDGE CLOUD SYSTEM

CROSS-REFERENCE TO RELATED APPLICATIONS

The present application is a continuation of U.S. patent application Ser. No. 15/182,290, filed Jun. 14, 2016, by Wei Wei, et al., and entitled "Modular Telecommunications Edge Cloud System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing is a model for the delivery of hosted services, which may then be made available to users through, for example, the Internet. Cloud computing enables ubiquitous, convenient, on-demand network access to a shared pool of configurable computing resources that can be provisioned and employed with minimal management effort or service provider interaction. By employing cloud computing resources, providers may deploy and manage emulations of particular computer systems through a network, which provide convenient access to the computing resources.

SUMMARY

One of the problems in the prior art in deploying cloud computing resources to a requesting customer is the cost and latency associated with having to access a backbone network to transmit services and content to the requesting customer. The concepts disclosed herein solve this problem by providing a modular and scalable telecommunications edge cloud (TEC) element that is disposed between the requesting customer and the backbone network. The TEC element is configured to transmit the services and content to the requesting customer without having to access the backbone network.

In one embodiment, the disclosure includes a TEC element, comprising TEC hardware layer comprising storage resources comprising a memory, networking resources coupled to the storage resources and comprising a plurality of network input and output ports, and computing resources coupled to the storage resources and the networking resources, wherein the computing resources comprise a plurality of processors, a TEC operating system (TECOS) coupled to the TEC hardware layer and configured to control and manage the storage resources, the networking resources, and the computing resources, wherein the TECOS is executed by one of the processors, and a TEC application layer coupled to the TECOS, wherein the TEC application layer is configured to process a request from a client using the TECOS, wherein the computing resources are configured to execute cloud applications to provide a service to the client when the request processed by the TEC application layer is a service request, wherein at least one of the networking resources and the storage resources is configured to provide data to the client when the request comprises a data request, and wherein the TEC element is deployed between the client and a packet network. In some embodiments, the disclosure also includes wherein the data may be received from a core data center through the packet network and stored in the memory of the storage resources, and/or wherein the TECOS is configured to instantiate a virtual machine (VM) to execute the cloud application on a second one of the processors, and/or wherein the data is stored in a cache of the storage resources, and wherein the data is provided to the client directly from the cache, and/or wherein the networking resources further comprises at least one of a provider edge (PE) router, an optical line terminal (OLT), a broadband network gateway (BNG), wireless access point equipment, and an optical transport network (OTN) switch, and/or wherein the TEC application layer comprises at least one of an internet access application, a virtual private network (VPN) application, a content delivery network (CDN) application, a virtual private cloud (vPC) application, an Internet of Things (IoT) application, and a data analytics application, etc., and/or further comprising fabric resources configured to interconnect the computing resources, storage resources, and networking resources, and wherein the fabric resources are also configured to interconnect the TEC element with a second TEC element in proximity to the TEC element.

In another embodiment, the disclosure includes an apparatus for providing cloud computing services to a client, comprising storage resources configured to store data, wherein the storage resources comprise a memory, networking resources coupled to the storage resources, computing resources coupled to the networking resources and the storage resources, wherein the computing resources comprise a plurality of processors, wherein a first one of the processors is configured to execute a TECOS configured to manage the storage resources, the networking resources, and the computing resources to provide requested services and data to the client, wherein a second one of the processors is configured to execute a cloud application when a service request associated with the cloud application is received from the client, wherein the networking resources are configured to provide data to the client from the storage resources when a data request is received from the client and the data is stored in the memory of the storage resources, and wherein the apparatus is deployed between the client and a packet network. In some embodiments, the disclosure further includes wherein when the request for the data is received from the client and when the data is not stored at the memory of the storage resources, the networking resources are configured to transmit a request for the data to a core data center, receive the data from the core data center, and transmit the data to the client, and/or wherein when the request for the data is received from the client and when the data is not stored at the memory of the storage resources, the networking resources are configured to transmit a request for the data to a TEC element, receive the data from the TEC element, and transmit the data to the client, and/or wherein when the request for the cloud operation is the request to execute a cloud application, the TECOS is configured to instantiate a VM to execute the cloud application on the second one of the processors, and/or wherein the plurality of processors comprises a first processor and a second processor, wherein the first processor is configured to execute a first instance of the TECOS, and wherein the second processor is configured to execute a second instance of the TECOS.

In yet another embodiment, the disclosure includes a method implemented by a TEC element, comprising receiving, through a TEC application layer, a request from a client for data or services corresponding to an application on the TEC application layer, providing, with computing resources of the TEC element and a TECOS, the services to the client when the request is a service request corresponding to the application, determining whether the data requested by the client is stored within storage resources of the TEC element when the request is a data request, transmitting, using networking resources, the data to the client when the data is stored within the storage resources of the TEC element, wherein the TECOS is configured to manage the networking resources, the computing resources, and the storage resources of the TEC element, and wherein the TEC element is deployed between the client and a packet network. In some embodiments, the disclosure further includes further comprising receiving, by the networking resources, the data from a core data center via the packet network, and storing, in the storage resources, the data after receiving the data from the core data center, and/or further comprising partitioning the memory of the TEC element based on at least one of a client, a telecommunication service provider, a content service provider, and a location of the TEC element, and/or wherein providing the services to the client using the TECOS when the request is for the services associated with the application comprises instantiating, by the computing resources, a VM on the TEC element to execute the application and provide the services to the client, and/or wherein the computing resources are configured to execute a plurality of TECOS instances using a plurality of computing cards, wherein a first computing card of the computing resources is configured to execute a first instance of the TECOS, and wherein a second computing card of the computing resources is configured to execute a second instance of the TECOS, and/or further comprising receiving the data from a second TEC element coupled to the TEC element, wherein the TEC application layer comprises at least one of an internet access application, a VPN application, a CDN application, vPC application, an IoT application, and a data analytics application, etc. and/or wherein the computing resources comprises a plurality of processors, wherein the TECOS is executed by a first one of the processors, and wherein the application is executed by a second one of the processors.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
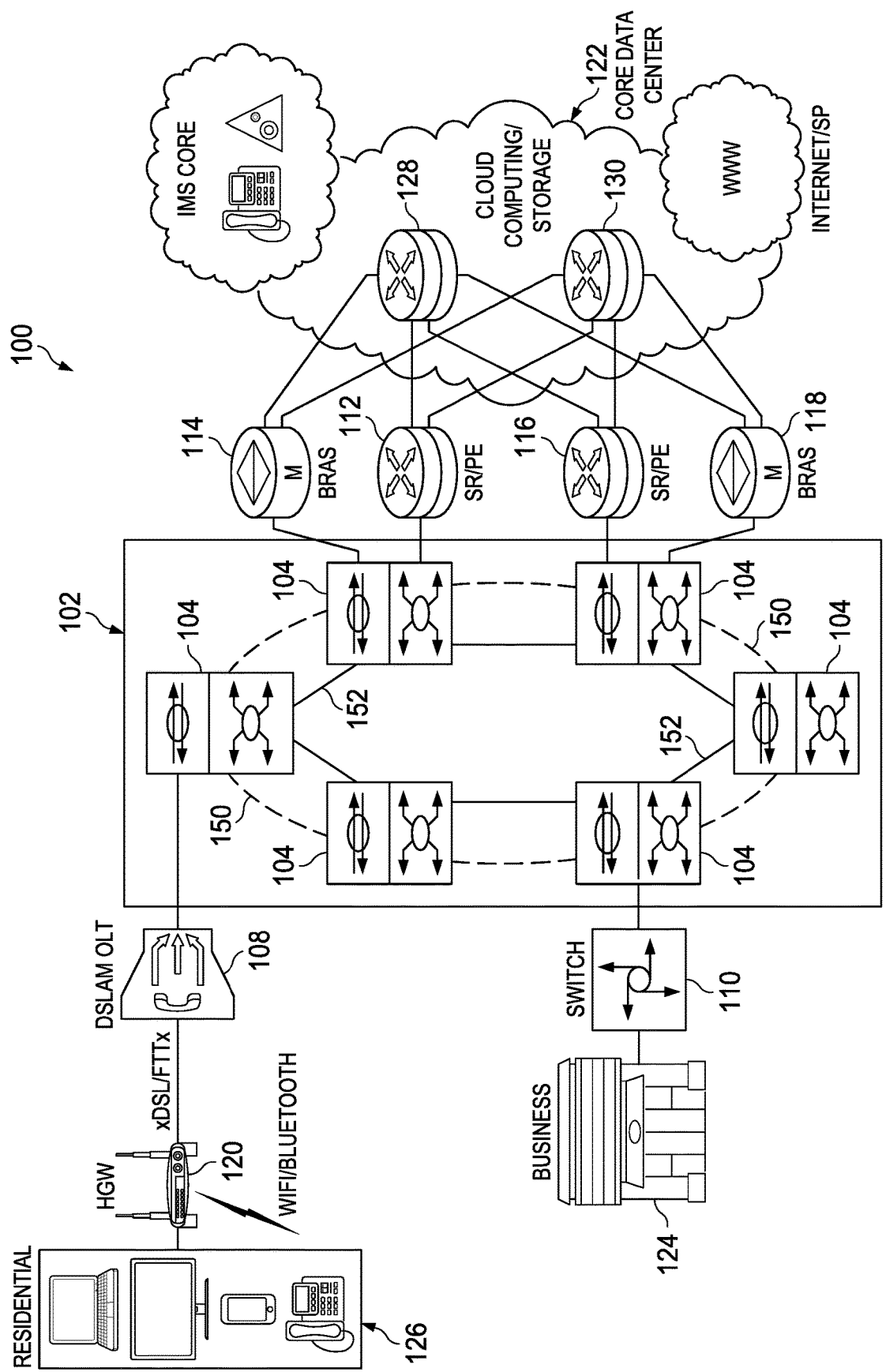
FIG. 1 is a schematic diagram of a system comprising a packet network.

FIG. 1 is a schematic diagram of a system 100 comprising a packet network 102. System 100 is configured to support packet transport and optical transport services among network elements using the packet network 102. For example, system 100 is configured to transport data traffic for services between clients 124 and 126 and a service provider 122. Examples of services may include, but are not limited to, Internet service, VPN services, value added service (VAS) services, Internet Protocol Television (IPTV) services, CDN services, IoT services, data analytics applications, and Internet Protocol Multimedia services. System 100 comprises packet network 102, network elements 108, 110, 112, 114, 116, 118, 120, 128, and 130, service provider 122, and clients 124 and 126. System 100 may be configured as shown or in any other suitable manner.

Packet network 102 is a network infrastructure that comprises a plurality of integrated packet network nodes 104. Packet network 102 is configured to support transporting both optical data and packet switching data. Packet network 102 is configured to implement the network configurations to configure flow paths or virtual connections between client 124, client 126, and service provider 122 via the integrated packet network nodes 104. The packet network 102 may be a backbone network which connects a cloud computing system of the service provider 122 to clients 124 and 126. The packet network 102 may also connect a cloud computing system of the service provider 122 to other systems such as external Internet, other cloud computing systems, data centers, and any other entity that requires access to the service provider 122.

Integrated packet network nodes 104 are reconfigurable hybrid switches configured for packet switching and optical switching. In an embodiment, integrated packet network nodes 104 comprise a packet switch, an optical data unit (ODU) cross-connect, and a reconfigurable optical add-drop multiplex (ROADM). The integrated packet network nodes 104 are coupled to each other and to other network elements using virtual links 150 and physical links 152. For example, virtual links 150 may be logical paths between integrated packet network nodes 104 and physical links 152 may be optical fibers that form an optical wavelength division multiplexing (WDM) network topology. The integrated packet network nodes 104 may be coupled to each other using any suitable virtual links 150 or physical links 152 as would be appreciated by one of ordinary skill in the art upon viewing this disclosure. The integrated packet network nodes 104 may consider the network elements 108-120 as dummy terminals (DTs) that represent service and/or data traffic origination points and destination points.

Network elements 108-120, 128, and 130 may include, but are not limited to, clients, servers, broadband remote access servers (BRAS), switches, routers, service router/provider edge (SR/PE) routers, digital subscriber line access multiplexer (DSLAM) optical line terminal (OTL), gateways, home gateways (HGWs), service providers, PE network nodes, customers edge (CE) network nodes, an Internet Protocol (IP) router, and an IP multimedia subsystem (IMS) core.

Clients 124 and 126 may be user devices in residential and business environments. For example, client 126 is in a residential environment and is configured to communicate data with the packet network 102 via network elements 120 and 108 and client 124 is in a business environment and is configured to communicate data with the packet network 102 via network element 110.

Examples of service provider 122 may include, but are not limited to, an Internet service provider, an IPTV service provider, an IMS core, a private network, an IoT service provider, and a CDN. The service provider 122 may include a cloud computing system. The cloud computing system, cloud computing, or cloud services may refer to a group of servers, storage elements, computers, laptops, cell phones, and/or any other types of network devices connected together by an Internet protocol (IP) network in order to share network resources stored at one or more data centers of the service provider 122. With a cloud computing solution, computing capabilities or storage resources are provisioned and made available over the network 102. Such computing capabilities may be elastically provisioned and released, in some cases automatically, to scale rapidly outward and inward based on demand.

In one embodiment, the service provider 122 may be a core data center that pools computing or storage resources to serve multiple clients 124 and 126 that request services from the service provider 122. For example, the service provider 122 uses a multi-tenant model where fine-grained resources may be dynamically assigned to a client specified implementation and reassigned to other implementations according to consumer demand. In one embodiment, the service provider 122 may automatically control and optimize resource use by leveraging a metering capability at some level of abstraction appropriate to the type of resource (e.g., storage, processing, bandwidth, and active user accounts). A cloud computing solution provides requested resources without requiring clients to establish a computing infrastructure to service the clients 124 and 126. Clients 124 and 126 may provision the resources in a specified implementation by providing various specification and artifacts defining a requested solution. The service provider 122 receives the specifications and artifacts from clients 124 and 126 regarding a particular cloud-based deployment and provides the specified resources for the particular cloud-based solution via the network 102. Clients 124 and 126 have little control or knowledge over the exact location of the provided resources, but may be able to specify location at a higher level of abstraction (e.g., country, state, or data center).

Cloud computing resources may be provided according to one or more various models. Such models include Infrastructure as a Service (IaaS), Platform as a Service (PaaS), and Software as a Service (SaaS). In IaaS, computer infrastructure is delivered as a service. In such a case, the computing equipment is generally owned and operated by the service provider 122. In the PaaS model, software tools and underlying equipment used by developers to develop software solutions may be provided as a service and hosted by the service provider. SaaS includes a service provider licensing software as a service on demand. The service provider 122 may host the software, or may deploy the software to a client for a given period of time. The service provider 122 may provide requested cloud-based services to the requesting clients 124 and 126 via either the IaaS, PaaS, or SaaS model.

Regardless of the employed model, one of the biggest challenges in deploying such cloud computing resources is the cost and latency associated with accessing the network 102 to receive requested data from the service provider 122 and transmit the requested data to the requesting client 124 or 126. For example, client 124 in a residential environment requests data, such as streaming media content, from the service provider 122. The service provider 122 that has the requested content is geographically distant from the requesting client 124 or 126 or a central office (CO)/remote office that serves the requesting client 124 or 126. Therefore, the service provider 122 must pay a cost for leasing a portion of the infrastructure in the network 102 to a telecommunication (telecom) service provider to provide the requested content to the client 124. In the same way, the telecom service provider bears the cost of providing networking resources to the service provider 122 to transmit the requested content to the CO or the client 124 or 126. The client 124 or 126 further suffers latency and Quality of Service (QoS) issues when the requested content is stored at a data center that is geographically far away from the CO or the client 124 or 126. Therefore, cloud deployment where the service provider 122 is located a great distance from the CO and the clients 124 and 126 takes a considerable amount of time, costs a considerable amount of money, is difficult to debug, and makes transporting data through a complex networking infrastructure laborious.

In addition, cloud computing resources are usually stored in the data center of the service provider 122 and provided to COs via the network 102 on an as needed basis. The data center includes a complex system of servers and storage elements to store and process the cloud computing resources. For example, the data center includes a large and complex system of storage and processing equipment that is interconnected by leaf and spine switches that cannot easily be transported or modified. Networking hardware at the CO, such as a router or a switch, is configured to route the resources to the appropriate client 124 or 126. Therefore, the CO usually only includes the networking hardware necessary to route data to the clients 124 and 126. Therefore, in a traditional cloud computing environment, the CO or edge points of presence (POPs) lacks the ability to provide cloud computing services to clients 124 and 126 because of the large-scale, complex nature of the data center equipment that would be required to provide cloud computing services to clients 124 and 126.

Disclosed herein are systems, methods, and apparatuses that provide a scalable and modular TEC element that is disposed between the client, such as clients 124 and 126, and a network, such network 102, such that the service provider 122 is able to provide requested resources to the client in a cost effective manner. The TEC element includes the same cloud computing resources that the service provider 122 includes, but on a smaller scale. As such, the TEC element is modular and scalable and can be disposed at a location closer to the client. For example, the TEC element is disposed at a local CO/remote office that is accessible by the client without having to access the network elements 108-120, 128, and 130.

Traditional telecom COs and edge POPs may be converted into edge data centers for common service delivery platforms using some of the embodiments disclosed herein. A compact integrated cloud environment in remote branches and COs may be valuable to telecom service providers because compact cloud environments will help improve service experiences (e.g., low latency, high throughput) to end-customers with low cost and also help improve cloud operation efficiency to service providers. Telecom service providers may transform into cloud-centric infrastructures using the embodiments of the TEC element disclosed herein.

Figure 2:
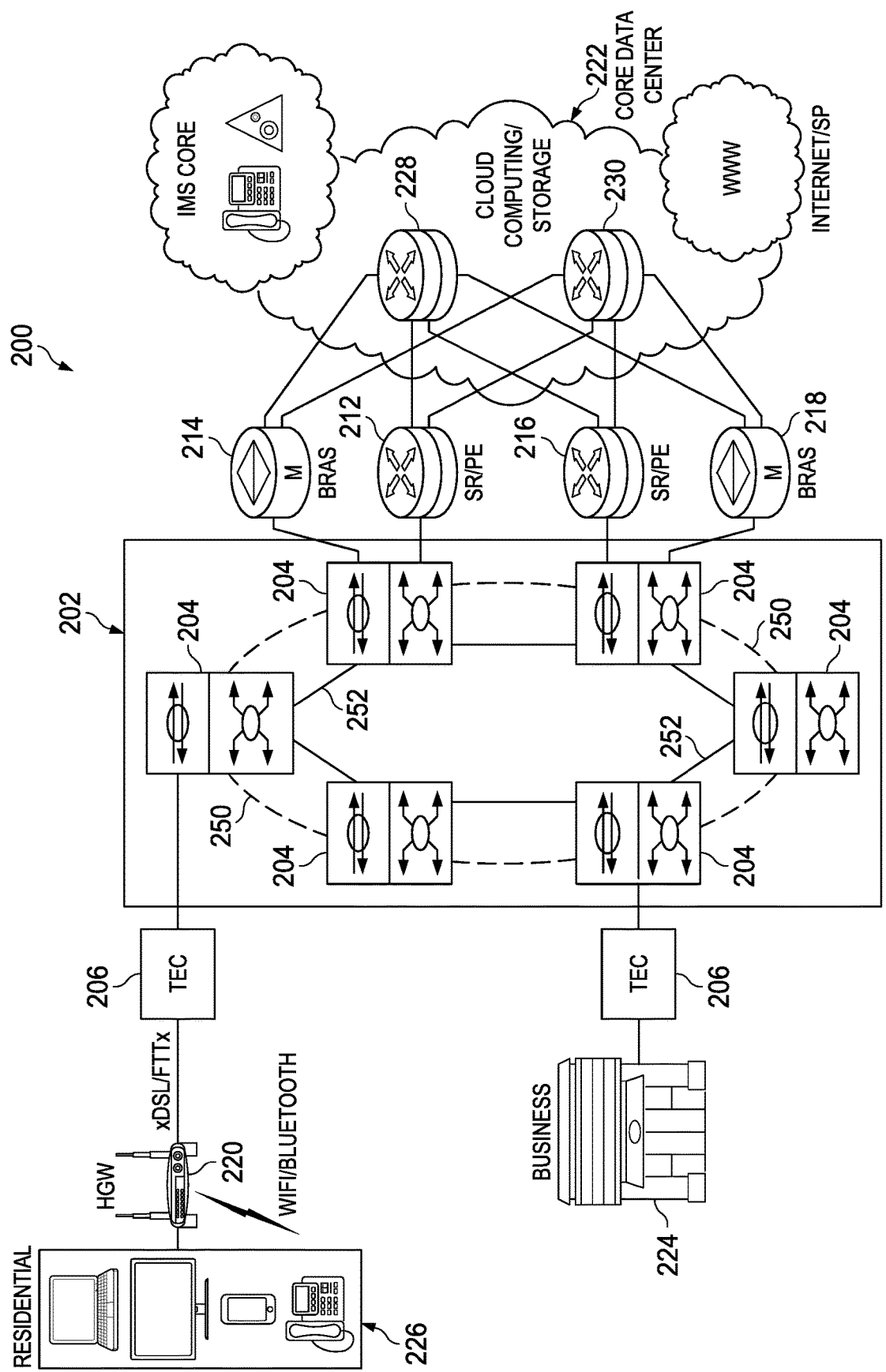
FIG. 2 is a schematic diagram of an embodiment of a system comprising a packet network and TEC element.

FIG. 2 is a schematic diagram of an embodiment of a system 200 comprising a packet network 202 and a TEC 206. System 200 is a distributed cloud network which is similar to system 100, except that system 200 includes one or more TEC elements 206 disposed in between the packet network 202 and the clients 224 and 226 such that the clients 224 and 226 receive data and services directly from the TEC element 206. System 200 is configured to support packet transport and optical transport services among the clients 224 and 226, a TEC element 206, and the service provider 222 using the packet network 202 when necessary. System 200 comprises a packet network 202, network elements 212, 214, 216, 218, 220, 228, and 230, service provider 222, TEC element 206, and clients 224 and 226, each of which are configured to operate in fashions similar to those described in system 100. The network 202 comprises a plurality of network nodes 204 that are configured to implement the network configurations to configure flow paths between the TEC element 206 and the service provider 222 via the network nodes 204. As shown in FIG. 2, the TEC element 206 is disposed in between the clients 224 and 226 and the packet network 202. System 200 may be configured as shown or in any other suitable manner.

System 200 is configured to transport data traffic for services between clients 224 and 226 and the TEC element 206. System 200 may also be configured to transport data traffic for services between the TEC element 206 and the service provider 222. Examples of services may include, but are not limited to, Internet service, VPN services, VAS services, IPTV services, CDN services, IoT services, data analytics applications, and Internet Protocol Multimedia services.

In some embodiments, the TEC element 206 is a device that is configured to operate in a manner similar to the service provider 222, except that the TEC element 206 is a miniaturized version of a data center that also includes networking input/output functionalities, as further described below in FIG. 3. The TEC element 206 may be implemented using hardware, firmware, and/or software installed to run on hardware. The TEC element 206 is coupled to network elements 212, 214, 216, and 218 using any suitable virtual links, physical links, or optical fiber links. As shown in FIG. 2, the TEC element 206 is disposed in a location between the clients 224 and 226 and the network 202. The TEC element 206 may periodically synchronize cloud data from the service provider 222 via the network 202. TEC element 206 stores the cloud data locally in a memory or/and a disk so that the TEC element 206 may transmit the cloud data to a requesting client without having to access the network 202 to receive the data from the service provider 222.

In one embodiment, the TEC element 206 may be configured to receive data, such as content, from the service provider 222 via the network 202 and store the data in a cache of the TEC element 206. For example, the TEC element 206 receives specified data for a particular cloud-based application via the network 202 and stores the data into the cache. A client 226 in a residential environment may transmit a request to the TEC element 206 for a particular cloud-based deployment associated with the particular cloud-based application that has now been stored in the cache. The TEC element 206 is configured to search the cache of the TEC element 206 for the requested cloud-based application and provide the data directly to the client 226. In this way, the client 226 receives the requested content from the TEC element 206 faster than if the client 224 were to receive the content from the service provider 222 via the network 202.

The TEC element 206 may be disposed at a CO disposed in between the network 202 and the clients 224 and 226. In one embodiment, the TEC element 206 is a compact and intelligent edge data center working as a common service delivery platform. The TEC element 206 is a highly flexible and extensible element in terms of supporting existing telecom services by leveraging network function virtualization (NFV) techniques, such as carrier Ethernet services, voice over Internet protocol (VoIP) services, cloud-based video streaming services, IoT services, smart home services, smart city services, etc. The TEC methods and systems disclosed herein will help telecom service providers and/or content service providers improve user experiences while reducing the cost of telecom services. The TEC methods and systems disclosed herein also help telecom service providers and/or content service providers conduct rapid services innovations and rapid service deployments to clients 224 and 226. In this way, the TEC element 206 performs faster and provides higher quality data than a traditional cloud computing system, located at a distant service provider 222.

Figure 3:
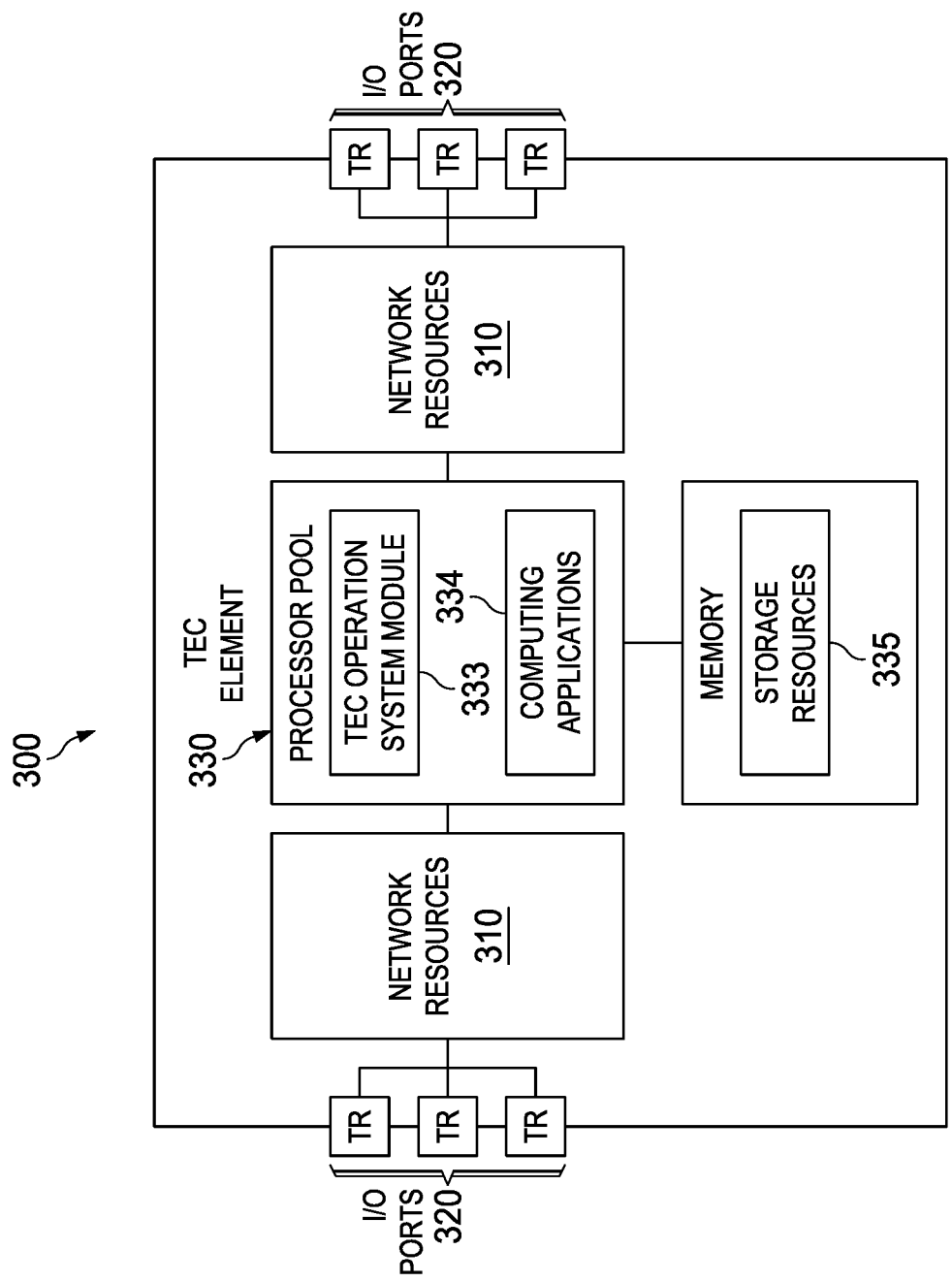
FIG. 3 is a schematic diagram of an embodiment of the TEC element.

FIG. 3 is a schematic diagram of an embodiment of a TEC element 300, which is similar to TEC element 206 of FIG. 2. The TEC element 300 is a modular telecom device which integrates networking resources, computing resources, storage resources, operation system, and various cloud applications into one compact box or chassis. The TEC element 300 may be a modified network element, a modified network node, or any other logically/physically centralized networking computing and storage device that are configured to store and execute cloud computing resources locally and transmit data to a client, such as clients 224 and 226. The TEC element 300 may be configured to implement and/or support the telecom edge cloud system mechanisms and schemes described herein. The TEC element 300 may be implemented in a single box/chassis or the functionality of the TEC element 300 may be implemented in a plurality of interconnected boxes/chassis. The TEC element 300 may be any device including a combination of devices (e.g., a modem, a switch, router, bridge, server, client, controller, memory, disks, cache, etc.) that stores cloud computing resources and transports or assists with transporting the cloud applications or data through a network, such as the network 202, system, and/or domain.

At least some of the features/methods described in the disclosure are implemented in a networking/computing/ storage apparatus such as the TEC element 300. For instance, the features/methods in the disclosure may be implemented using hardware, firmware, and/or software installed to run on hardware. The TEC element 300 is any device that has cloud computing, storage resources, e.g., a memory and a central processing unit (CPU), and networking resources that transports packets through a network, e.g., a switch, router, bridge, server, a client, etc. As shown in FIG. 3, the TEC element 300 comprises network resources 310, which may be transmitters, receivers, switches, routers, switching fabric or combinations thereof. In some embodiments, the network resources 310 may comprise a PE router, an OLT, a BNG, wireless access point equipment, and/or an OTN switch. The network resources 310 are coupled to a plurality of input/output (I/O) ports 320 for transmitting and/or receiving packets or frames from other nodes.

A processor pool 330 is a logical CPU in the TEC element 300 that is coupled to the network resources 310 and executes computing applications such as virtual network functions (VNFs) to manage various types of resource allocations to various types of clients 224 and 226. The processor pool 330 may comprise one or more multi-core processors and/or memory devices 332, which may function as data stores, buffers, etc. In one embodiment, the processor pool 330 is implemented by one or more computing cards and control cards, as further described in FIGS. 8 and 9. In one embodiment, the processor pool 330 may be implemented as generic servers, VMs, containers or may be part of one or more application specific integrated circuits (ASICs) and/or digital signal processors (DSPs).

The processor pool 330 comprises a TECOS module 333, which may control and manage the networking, computing, and storage functions of the TEC element 300 and may implement method 1100, application programming interfaces (APIs), as discussed more fully below, and/or any other flowcharts, schemes, and methods discussed herein. In one embodiment, the TECOS module 333 may be implemented inside one or more control cards, as further described with references to FIGS. 8 and 9. The processor pool 300 also comprises computing applications 334, which may perform or execute cloud computing operations requested by clients. In one embodiment, the computing applications 334 may be implemented by one or more computing cards, as further described with references to FIGS. 8 and 9. As such, the inclusion of the TECOS module 333 and the computing applications 334 and associated methods and systems provide improvements to the functionality of the TEC element 300. Further, the TECOS module 333 and the computing applications 334 may effect a transformation of a particular article (e.g., the network) to a different state. In an alternative embodiment, the TECOS module 333 and the computing applications 334 may be implemented as instructions stored in the memory device 332, which may be executed by the processor pool 330. The processor pool 300 may have any other means to implement FIGS. 8 and 9.

The memory device 332 may comprise storage resources 335, and a cache for temporarily storing content, e.g., a random-access memory (RAM). Additionally, the memory device 332 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof.

Figure 4:
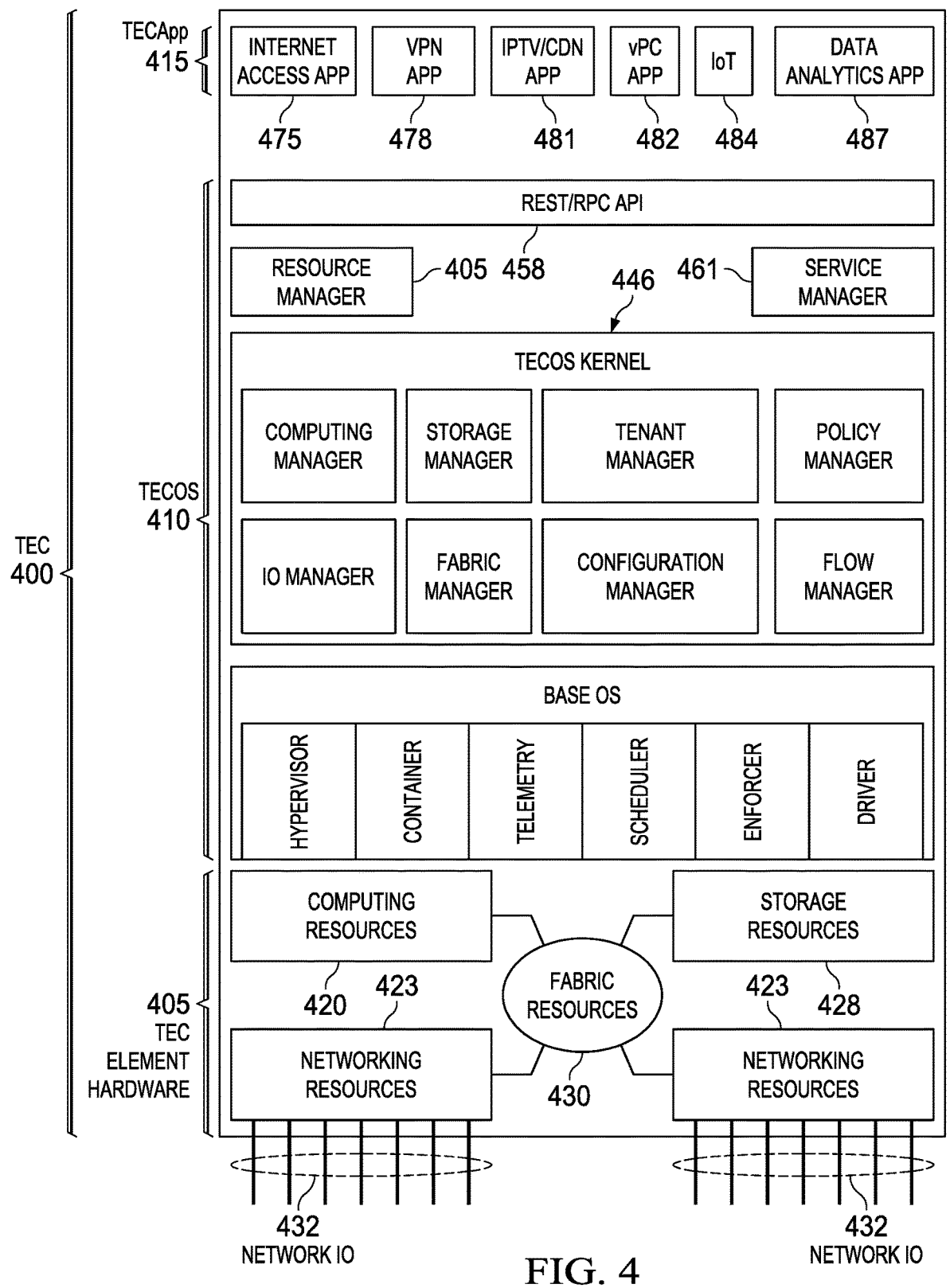
FIG. 4 is a schematic diagram of an embodiment of the TEC element.

FIG. 4 is a schematic diagram of an embodiment of a TEC element 400, which is similar to the TEC element 206 and 300 for FIGS. 2-3. The TEC element 400 conducts the networking and computing related functions for the clients 224 and 226 of FIG. 2. The TEC element 400 comprises a TEC hardware module 405, a TECOS 410, such as the TECOS module 333, and a TEC application layer 415. The TEC application layer 415 shows example services or applications that clients, such as clients 224 and 226, may request from a cloud computing environment. The TEC hardware module 405 comprises the hardware components required to provide the services to the clients. The TECOS 410 may be a software suite that executes to integrate the networking, computing, and storage capabilities of the TEC element 400 to provide the abstracted services to clients using the TEC hardware module 405.

The TEC application layer 415 is a layer describing various services or applications that a client may request from a TEC element 400. The services include, but are not limited to, an internet access application 475, a VPN application 478, an IPTV/CDN application 481, a vPC application 482, and an IoT application 484 and a data analytics application 487. The internet access application 475 may be an application that receives and processes a request from a client or a network operator for access to the internet. The VPN application 478 may be an application that receives and processes a request from a client or a network operator to establish a VPN within a private network (e.g., private connections between two or more sites over service provider networks). The IPTV/CDN application 481 may be an application that receives and processes a request from a client or a network operator for content from an IMS core. The vPC application 482 may be an application that is accessed by a TEC element administrator to allocate computing or storage resources to customers. The IoT application 484 may be an application that receives and processes a request from a smart item for content or services provided by a services provider, such as service provider 222. The data analytics application 487 may be an application that receives and processes a request from a client or a network operator for data stored at a data center in a cloud computing system. The internet access application 475, VPN application 478, IPTV/CDN application 481, IoT application 484, and data analytics application 487 may each be configured to transmit the requests to access cloud computing resources to the TECOS 410 for further processing. In some embodiments, the TEC applications can be developed by a TEC operator and external developers to provide a rich TEC ecosystem.

The TEC application layer 415 may interface with the TECOS 410 by means of APIs based on a representational state transfer (REST) or remote procedure call (RPC)/APIs 458. The TECOS 410 is configured to allocate and deallocate the hardware resources of the TEC hardware module 405 to different clients dynamically and adaptively according to applications requirements. The TECOS 410 may comprise a base operating system (OS) 434, a TECOS kernel 445, a resource manager 455, the REST/RPC API 458, and a service manager 461. The components of the TECOS 410 communicate with each to manage control over the TEC element 400 and all of the components in the TEC hardware module 405.

The REST/RPC API 458 is configured to provide an API collection for applications to request and access the resources and program the network I/O in a high-level and automatic manner. The TEC application layer 415 interfaces with the TECOS 410 by means of REST/RPC APIs 458 to facilitate TEC application development both by the TEC operator and external developers, thus resulting in a rich TEC ecosystem. Some of the basic functions that the TECOS 410 components should support through the REST/API 458 include, but are not limited to, the following calls: retrieve resources (GET), reserve resources (POST), release resources (DELETE), update resources (PUT/PATCH), retrieve services (GET), create/install services (POST), remove services (DELETE), and update services (PUT/PATCH). Moreover, the various applications may listen and react to events or alarms triggered by the TECOS 410 through the REST/RPC API 458.

The components of the TECOS kernel 445 communicate with the resource manager 455, REST/RPC API 458, and the service manager 461 to abstract the hardware components in the TEC hardware module 405 that are utilized to provide a requested service to a client. The resource manager 455 is configured to manage various types of logical resources (e.g., VMs, containers, virtual networks, and virtual disks) in an abstract and cohesive way. For example, the resource manager 455 allocates, reserves, instantiates, activates, deactivates, and deallocates various types of resources for clients and notifies the service manager 461 of the operations performed on the resources. In one embodiment, the resource manager 455 maintains the relationship between various logical resources in a graph data structure.

The service manager 461 is configured to provide service orchestration mechanisms to discompose the TEC application requests into various service provisioning units (e.g., VM provisioning and network connectivity provisioning) and map them to the corresponding physical resource units to satisfy a service level agreement (SLA). An SLA is a contract between a service provider, such as service provider 222, and a client, such as clients 224 and 226, that defines a level of service expected by the service provider and/or the client. In one embodiment, the resource manager 455 and the service manager 461 communicate with the TECOS kernel 445 by means of direct/native method/function calls to provide maximum efficiency given the large amount of API calls utilized between the components of the TECOS 410.

The TECOS kernel 445 may comprise a computing manager, a storage manager, a tenant manager, a policy manager, an input/output (I/O) manager, a fabric manager, a configuration manager, and a flow manager. The computing manager may be configured to provide the life-cycle management services for VMs and containers. For example, the computing manager manages the creation/deletion, activation/deactivation, loading, running, and stopping an image or program that is running. The storage manager may be configured to offer low-level storage resources functionalities such as virtual disk allocation and content automatic replication. The tenant manager is configured to manage the tenants in an isolated manner for the virtual vPC application. For example, the tenant manager is configured to partition the memory of the TEC element 400 based on at least one of a client, a telecommunication service provider, a content service provider, and a location of the TEC element. The policy manager may be configured to manage the high-level rules, preferences, constraints, objectives, and intents for various resources and services. The service manager 461 and resource manager 455 may access and configure the policy manager when needed. The I/O manager is configured to manage all networking I/O port resources in terms of data rate, data format, data protocol, and switching or cross-connect capability. The resource manager may access the I/O manager for the allocation/deallocation of networking resources. The fabric manager is configured to provide internal communications between various hardware cards/boards/blades. In one embodiment, the fabric manager comprises a plurality of physical or virtual links configured to facilitate the transmission of data between the hardware resources within the TEC element and between other TEC elements 400. The configuration manager may communicate with the resource manager 455 to configure parameters, such as an Internet Protocol (IP) addresses, for hardware and software components. The flow manager is configured to program the network I/O system with flow rules such as a match/actions set. A flow rule such as match/actions concept defines how a traffic flow is processed inside the TEC element. The match is usually based on meta-data, such as source subnet/IP address, destination subnet/IP address, Transmission Control Protocol (TCP) port, and IP payload type. The actions may be dropped, forwarded to another I/O port, go to the VNF for further processing, and delegated to the TECOS.

The base operating system 434 may be an operating system, such as Microsoft Windows®, Linux®, Unix®, or a brand-new light-weight real-time computer operation system, configured to integrate with the TECOS kernel 445, resource manager 455, REST/RPC API 458, and service manager 461 to manage control over the TEC hardware module 405 and to provide requested services to clients. In some embodiments, the base operating system 434 may be Debian-based Linux or RTLinux. The base operating system 434 comprises a hypervisor, container, telemetry, scheduler, enforcer, and driver. The hypervisor is configured to slice the computing and storage resources into VMs. For example, the hypervisor is a kernel-based virtual machine (KVM)/quick emulator (QEMU) hypervisor. The container is a native way to virtualize the computing resources for different applications such as VNFs and virtual content delivery networks (vCDN). For example, the container is a docker. The telemetry is configured to monitor events/alarms/meters and to collect statics data from the data planes including the hardware and software, such as the VNFs. The scheduler is configured to decide the best way to allocate the available resources to various service units. For example, the scheduler selects the best network I/O port based on a given policy setting when there are many available network I/O ports. The enforcer is configured to maintain the SLA for each type of service unit based on given polices such as a bandwidth guarantee for a traffic flow. The driver is configured to work closely with the hardware and software components to fulfill the actual hardware operations such as task executions and multi-table flow rules programming.

The TEC hardware module 405 comprises computing resources 420, networking resources 423, storage resources 428, fabric resources 430, and network I/O 432. The computing resources 420 comprises multiple CPUs, memories, and/or more multi-core processors and/or memory devices, which may function as data stores, buffers, etc. The computing resources 420 may be implemented as a general processor or may be part of one or more application specific integrated circuits (ASICs) and/or digital signal processors (DSPs). The computing resources 420 are configured to provide sliced computing environments such as VMs or containers through the TECOS 410 to control applications and virtual network functions. In one embodiment, the computing resources 420 are coupled to the storage resources 428 and the networking resources 423 through the fabric resources 430.

The storage resources 428 may be a hard disk or disk arrays. In one embodiment, the storage resources 428 may be a cache configured to temporarily store data received from core data centers in the service provider networks. The networking resources 423 may be coupled to the storage resources 428 so that the networking resources 423 may transmit the data to the storage resources 428 for storage.

The networking resources 423 may be coupled to the network input/outputs (I/O) 432. The networking resources 423 may include, but are not limited to, switches, routers, service router/provider edge (SR/PE) routers, wireless access point, digital subscriber line access multiplexer (DSLAM) optical line terminal (OTL), gateways, home gateways (HGWs), service providers, PE network nodes, customers edge (CE) network nodes, an Internet Protocol (IP) router, optical transport transponders, and an IP multimedia subsystem (IMS) core. The networking resources 432 are configured to receive client packets or cloud service requests, which are processed by the computing resources 420 or stored by the storage resources 428, and if needed it will be switched to other networking I/Os 432 for forwarding. The networking resources 423 are also configured to transmit requested data to a client using the network I/Os 432. The network I/Os 432 may include, but are not limited to, transmitters and receivers (Tx/Rx), network processors (NP), and/or traffic management hardware. The network I/Os 432 are configured to transmit/switch and/or receive packets/frames from other nodes, such as network nodes 204, and/or network elements, such as network elements 208 and 210.

The fabric resources 430 may be physical or virtual links configured to couple the computing resources 420, the networking resources 423, and the storage resources 428 together. The fabric resources 430 may be configured to interconnect all related hardware resources to provide physical connections. The fabric resources 430 may be analogous to the backplane/switching fabric cards/boards/blades in legacy switch/router equipment.

Figure 5:
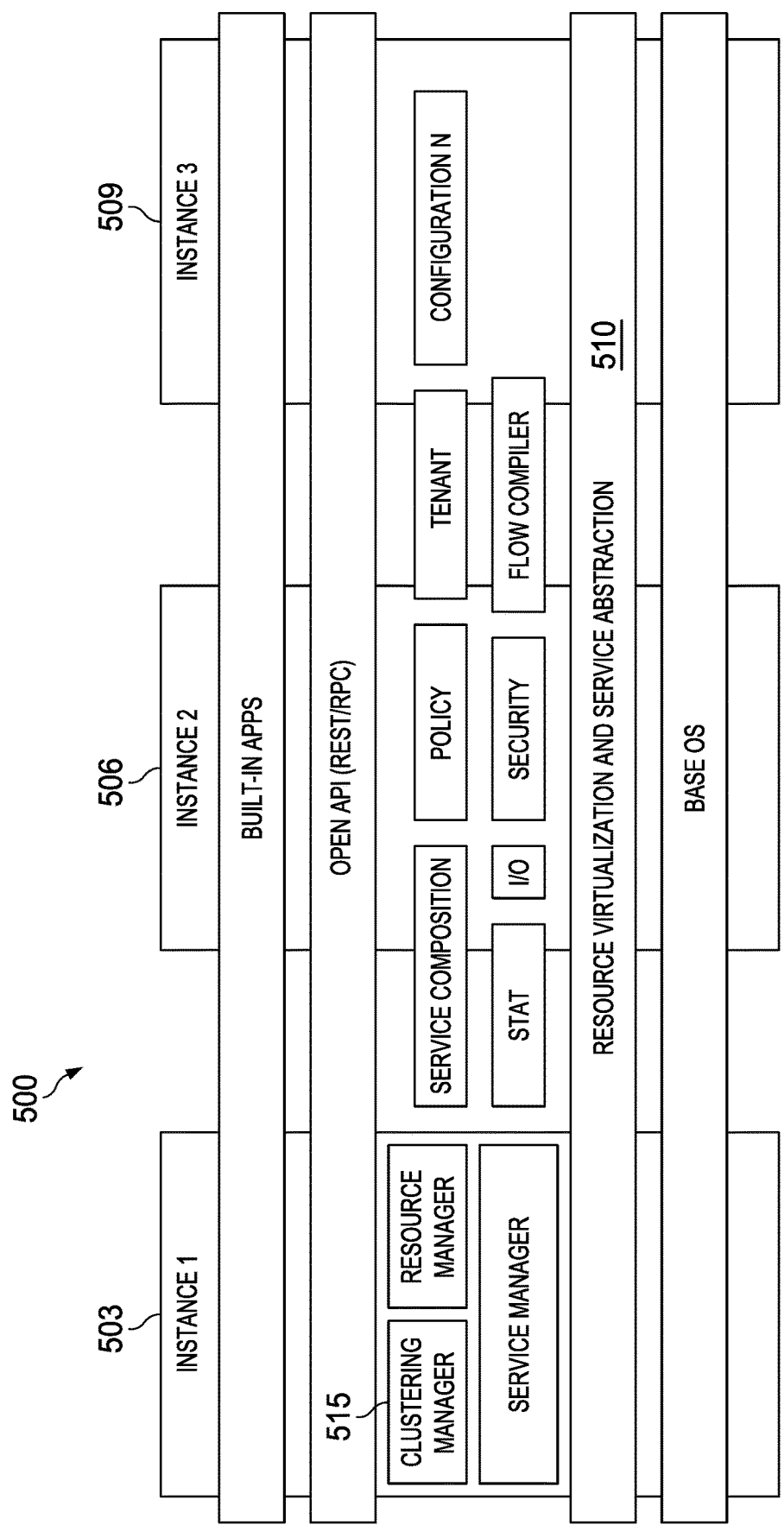
FIG. 5 is a schematic diagram of an embodiment of a TECOS within the TEC element.

FIG. 5 is a schematic diagram of an embodiment of a TECOS 500, which is similar to TECOS 410 of FIG. 4. TECOS 500 manages resources to provide cloud services to clients. In one embodiment, the resources that are managed include networking resources 423, computing resources 420, and storage resources 428 of FIG. 4. In an embodiment, the clients are similar to the clients 224 and 226 of FIG. 2. The TECOS 500 may be implemented and deployed in a software distributed system with data replication and synchronization between multiple instances 503, 506, 509 for high availability, high reliability, and high scalability purposes.

As shown in FIG. 5, the TECOS 500 includes a built-in applications layer, a REST/RPC API, a clustering manager 515, a resource manager, a service manager, a service composition, a policy manager, a tenant manager, a configuration manager, a statistics manager, an I/O manager, a security manager, a flow compiler, a resource virtualization and service abstraction layer 510, a base OS, and TECOS instances 503, 506, and 509. The built in applications layer may be similar to the TEC applications layer 415 of FIG. 4, and the REST/RPC API may be similar to the REST/RPC API 458 of FIG. 4. The resource manager may be similar to the resource manager 455 of FIG. 4, and the service manager may be similar to the service manager 461 of FIG. 4. The service composition, policy manager, tenant manager, configuration manager, statistics manager, I/O manager, security manager, flow compiler may operate and communicate as would be appreciated by one of ordinary skill in the art to facilitate managing the hardware resources of the TEC element. The resource virtualization and service abstraction layer 510 may be configured to implement the functionalities of a hypervisor, container, telemetry, scheduler, enforcer, driver described in FIG. 4. The clustering manager 515 is configured to manage communications, state synchronization, and data replications between the multiple TECOS instances 503, 506, and 509. As should be appreciated, there may be any number of TECOS instances 503-509 running on one or more TEC elements, such as TEC elements 300 and 400. The multiple TECOS instances 503-509 provide extra layers of survivability and reliability to the TECOS 500. For example, the TECOS instance 506 may execute the functions performed by the TECOS instance 503 when the TECOS instance 503 fails to execute.

The TECOS 500 may be a distributed system in that the TECOS 500 can be deployed on several machines or VMs for the carrier-grade availability purpose. The TEC element is a modular and scalable element that can be disposed at any location that a TEC operator desires. Therefore, the TECOS 500 is also modular and integrated to adequately provide the proper interface for wherever the TEC element is located. In addition, the TECOS 500 is a lightweight operation system that provides a high performance without too much overload for real-time carrier-grade resource and service operations.

Figure 6:
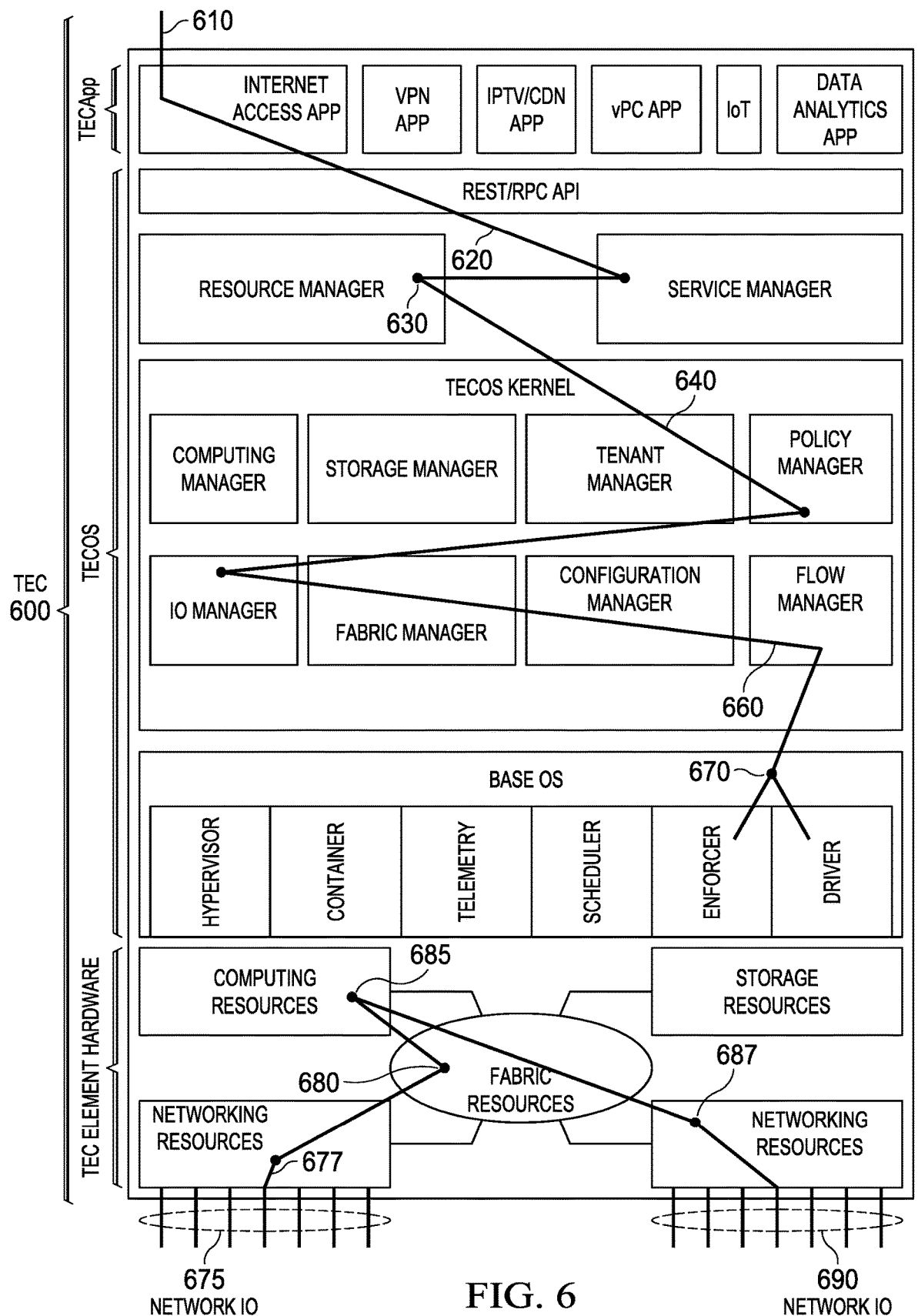
FIG. 6 is a schematic flow diagram of an embodiment of using the TEC element.

FIG. 6 is a schematic flow diagram of an embodiment of using a TEC element 600, such as the TEC elements 206, 300, and 400, to provide internet access service to a requesting client, such as clients 224 and 226. At point 610, an internet access application at a TEC application layer receives a request or order from a client for access to the internet via the TEC element 600. In an embodiment, the internet access application is similar to internet access application 475 of FIG. 4, the TEC application layer is similar to TEC application layer 415 of FIG. 4, and the client is similar to client 226 of FIG. 2 in a residential environment. At point 620, the internet access application sends the request to a service manager for service provisioning, such as the service manager 461. The service manager checks the SLA parameters, such as internet data rate, firewall, and network address translation (NAT), and generates the internet access service by identifying the resource requirements necessary to satisfy the request. For example, the resource requirements may indicate a number of VMs or containers that will be needed or an amount of I/O bandwidth that will be consumed. At point 630, the service manager may then call the resource manager, such as the resource manager 455, for service instantiation and activation. The resource manager may check the available inventory database for the assigned resources and create new computing resources such as VMs and/or containers to accommodate the requests, if necessary. For example, the service manager and/or the resource manager instantiate a VM via the hypervisor in the Base OS in FIG. 4 on the TEC element and automatically load a VNF image such as firewall to execute by the VM to offer an Internet security service to the client. At point 640, the policy manager may be called to determine high-level rule sets for the services requested. For example, the high-level rule sets may be parental controls for restricting access to certain websites, which are independent of any specific hardware resources. At point 650, the I/O manager may be called to reserve the bandwidth resource necessary to satisfy the request. At point 660, the flow manager may be called to program the network I/O resources to satisfy the request. At point 670, the enforcer and driver may be called to execute the policies (e.g., website filtering) as well as flow rules (e.g., traffic shaping) necessary to satisfy the request. The enforcer and driver are usually dependent of specific hardware resources.

At the TEC hardware module in the data plane, at point 675, the network I/O, such as network I/Os 432, receive the incoming packets for internet access from the client. At point 677, the incoming packets are received using the networking resources, such as the networking resources 423. At point 680, the incoming packets are forwarded through the fabric resources, such as the fabric resources 430, to the computing resources, such as the computing resources 420. In one embodiment, when the incoming packets need to be transmitted to another TEC element at another location or to another TEC element within a TEC box, the incoming packets are transmitted through the fabric resources to the other TEC element. At point 685, the VNFs inside the computing resources process the incoming packets to provide the requested services, such as a firewall and NAT, to the requesting client. At point 687, the requested services for Internet access are transmitted through the networking resources and at point 690 through the network I/O to a core data center or to the internet directly. The example processing of the request to access the Internet access shown in FIG. 6 shows how the TEC element 600 is able to centrally provide flexible services through various virtualized cloud services and data directly to the client from the TEC element 600 rather than having to go through a backbone network to receive the requested cloud services and resources.

Figure 7:
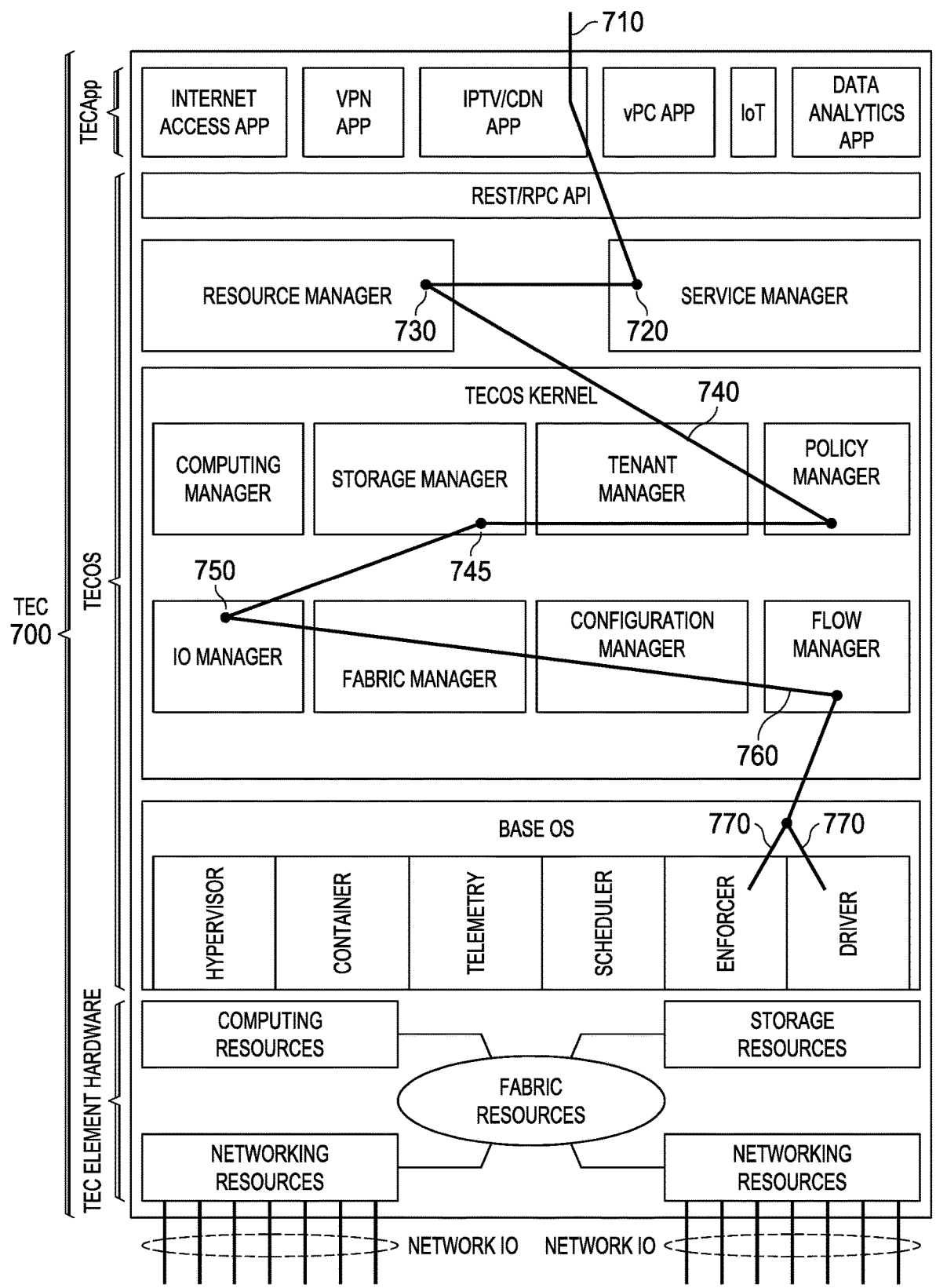
FIG. 7 is a schematic flow diagram of an embodiment of using the TEC element.

FIG. 7 is a schematic flow diagram of an embodiment of using a TEC element 700, such as the TEC elements 206, 300, 400, and 600, to provide streaming media content to a requesting client, such as clients 224 and 226. At point 710, an IPTV/CDN application at a TEC application layer receives a request from a client for streaming media content, such as video content, that may be stored at the TEC element 700. In an embodiment, the IPTV/CDN application is similar to the IPTV/CDN application 481 of FIG. 4, the TEC application layer is similar to the TEC application 415 of FIG. 4, and the client is similar to the client 226 of FIG. 2 in a residential environment. At point 720, IPTV/CDN application sends the request to the service manager, such as the service manager 461. The service manager identifies the resources necessary to satisfy the requests and notifies the resource manager, such as the resource manager 455 of the necessary resources. At point 730, the resource manager may determine whether new resources (e.g., storage resources) need to be created or reserved to accommodate the request. At point 740, the policy manager may be accessed to determine the high-level rules for the service requested. For example, the high-level rule sets may be website content filters which are independent of any specific hardware resources. At point 745, the storage manager may be called to reserve a given amount of storage space for the requested media content. At point 750, the I/O manager may be called to reserve bandwidth for streaming the requested media content. At point 760, the flow manager may be called to setup the flow rules for the network I/O ports. For example, the flow rule of the network I/O ports may be traffic metering. At point 770, the enforcer and driver may be called to execute the specific hardware operations for the resource reservation to satisfy the request.

At the TEC hardware module in the packet forward plane, the media content is distributed from the TEC element to different customers using the multicast techniques. The storage resources, such as the storage resources 428, may store media content in a cache. If the requested media content is not found in the cache, the TEC element may retrieve the requested media content from a service provider, such as the service provider 222, a remote core data center, or another TEC element via the networking resources, such as the networking resources 423, and the network I/O, such as the network I/O 432. If the requested media content is found in the cache, the requested media content is provided to the client directly from the cache.

Figure 8:
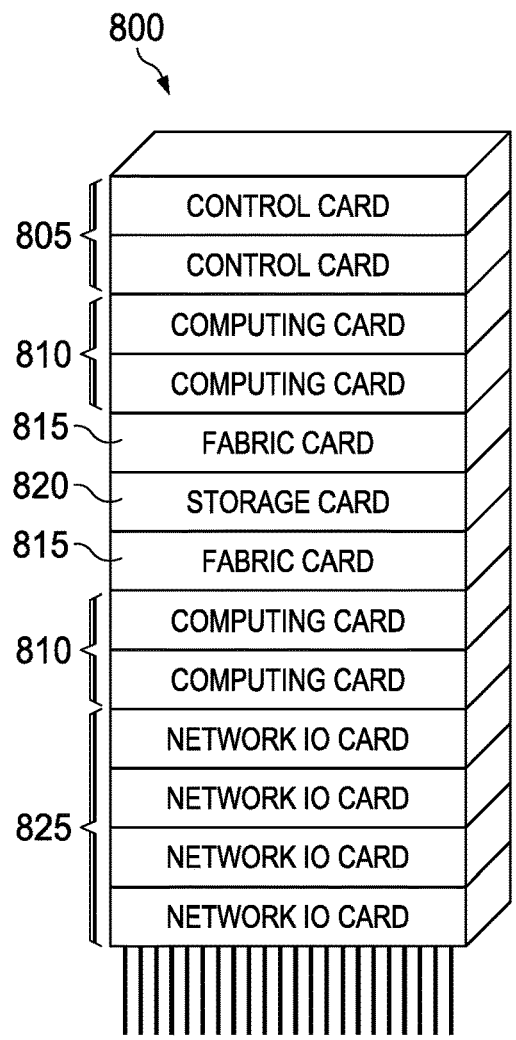
FIG. 8 is a schematic diagram of an embodiment of a hardware module within the TEC element.

FIG. 8 is a schematic diagram of an embodiment of a hardware module 800 within a TEC element. The hardware module 800 may be similar to the TEC element hardware 405 in FIG. 4. The hardware module 800 comprises one or more control cards 805, one or more computing cards 810, one or more fabric cards 815, one or more storage cards 820, and one or more network I/O cards 825. The hardware module 800 shows a horizontal arrangement of the various cards, or hardware components. As should be appreciated, the control cards 805, computing cards 810, fabric cards 815, storage cards 820, or network I/O cards 825 may be implemented as one or more hardware boards or blades. The hardware module 800 is scalable in that the TEC operator can build or modify the hardware module 800 to include more or less of any one of the hardware cards as necessary to provide the functionality desired. For example, a TEC operator may modifies a hardware module 800 located at the CO to include more storage cards 820 when a region supported by the CO needs to store more cloud applications or data locally due to a higher demand.

In some embodiments, the control cards 805 comprise one or more processors, such as the processor pool 330, and memory devices, such as the memory devices 332, and may be configured to execute the TECOS, such as the TECOSs 410 and 500. In one embodiment, each of the control cards 805 is configured to execute one instance of the TECOS, such as the TECOS instances 503-509. In some embodiments, the computing cards 810 comprise one or more processors, such as the processor pool 330, and memory devices 332, and are configured to implement the functions of the computing resources including VMs and containers for cloud applications, such as the computing resources 420. In some embodiments, the storage cards 820 comprise one or more memory devices 332 and may be configured to implement the functions of the storage resources, such as the storage resources 428. The storage cards 820 may comprise more memory devices than the control cards 805 and the computing cards 810. The network I/O cards 825 may comprise transmitters, receivers, switches, routers, switch fabric or combinations thereof, and may be configured to implement the functions of the networking resources, such as the networking resources 423. In one embodiment, the network I/O cards 825 comprise a provider edge router, a wireless access point, an optical line terminal, and/or a broadband network gateway. In one embodiment, the fabric cards 815 represent the fabric resources 430 and may be an Ethernet switch, which is configured to interconnect all related hardware resources to provide physical connections as needed.

As shown in FIG. 8, the hardware module 800 includes two control cards 805, four computing cards 810, two fabric cards 815, four network I/O cards 825, and one storage card 820. The hardware module 800 may be about 19 to 23 inches wide. The hardware module 800 is a height suitable to securely enclose each of the component cards. The hardware module 800 may include a cooling system for ventilation. The hardware module 800 may comprise at least 96/128 CPU cores. The storage card 820 may be configured to store at least 32 Tb of data. The network I/O cards 825 may be configured to transmit and receive data at a rate of approximately 1.92 terabytes (Tb) per second (s). The embodiment of the hardware module 800 shown in FIG. 8 serves, for example, up to 10,000 customers. The flow classification/programmable capability of the network I/O resources can be up to one million flows (i.e., 100 flows support for each end-customers in the case of 10,000 customers, one flow may be a TV channel).

The hardware module 800 may further include a power supply port configured to receive a power cord, for example, that provides power to the hardware module 800. In some embodiments, the hardware module 800 is configured to monitor the surrounding environment, record accessing of the storage card 820, monitor operations performed at and by the hardware module 800, provide alerts to a TEC operator upon certain events, be remotely controlled by a device controlled by a TEC operator located distant from the hardware module 800, and control a timing of operations performed by the hardware module 800. In one embodiment, the hardware module 800 comprises a dust ingress protector that protects dust from entering into the hardware module 800.

Figure 9:
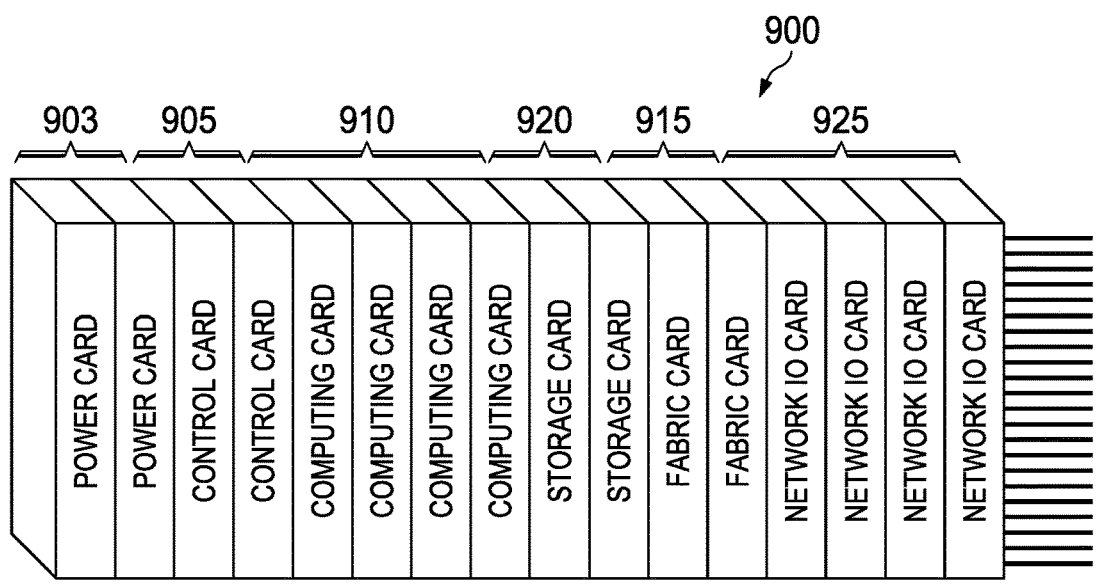
FIG. 9 is a schematic diagram of an embodiment of a hardware module within the TEC element.

FIG. 9 is a schematic diagram of an embodiment of a hardware module 900. The hardware module 900 is similar to hardware module 800, except that the hardware module 900 further includes a power/fan card 903, a different number of the one or more control cards 905, one or more computing cards 910, one or more fabric cards 915, one or more storage cards 920, and one or more network I/O cards 925, and each of the component cards are arranged in a vertical manner instead of a horizontal manner. The power/fan card 903 may be hardware configured to provide power and/or a fan to the hardware module 900. The hardware modules 800 and 900 show an example of how the TEC elements disclosed herein are designed to be modular and flexible in design to accommodate an environment where the TEC element will be located and a demand of the resources needed by the clients requesting data from the TEC element.

Figure 10:
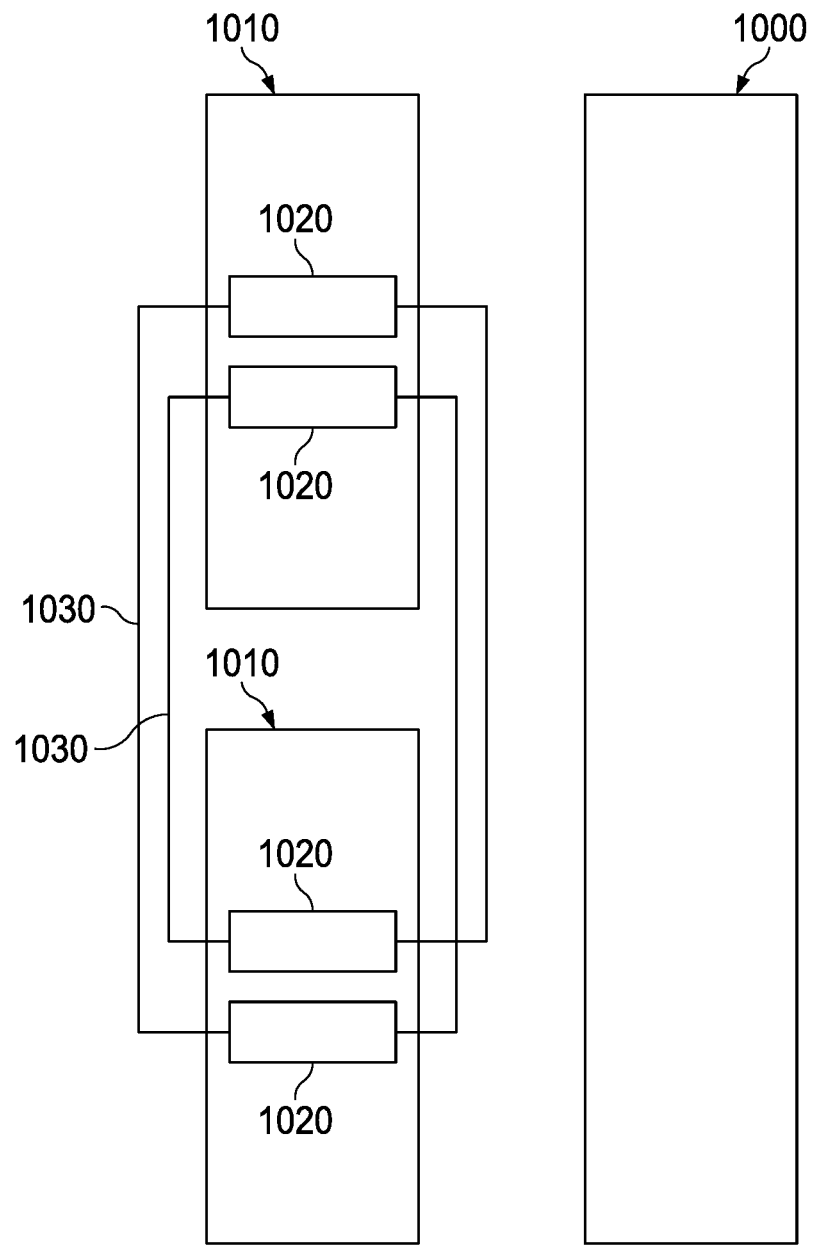
FIG. 10 is a schematic diagram of a stackable TEC box formed from a plurality of modular TEC elements stacked together.

FIG. 10 is a schematic diagram of a stackable TEC box 1000. The stackable TEC box 1000 comprises a plurality of modular TEC elements 1010 that have been stacked or otherwise joined together. The TEC elements 1010 are similar to the TEC elements 206, 300, and 400. Each of the TEC elements 1010 may comprise one or more fabric elements 1020, such as the fabric resources 430, fabric cards 815, and fabric cards 915. The fabric cards 1020 in each of the TEC elements 1010 of a stackable TEC box 1000 may be interconnected by links 1030. The links 1030 may be physical links that allow communication of data between each of the TEC elements 1010. The TEC box 1000 shows scalability of the functions of the TEC elements 1010 such that a TEC operator can expand a TEC element 1010 into a plurality interconnected TEC elements 1010 to form a TEC box 1000 to support more customers in a local office/CO when demand for resources increases.

In one embodiment, the TEC box 1000 may comprise a plurality of TEC elements 1010, each of which is at least partially enclosed, and stacked upon each other. In this embodiment, a TEC operator may stack another TEC element 1010 on top of another TEC element 1010 or in between TEC elements 1010 in the TEC box 1000 and connect the fabric cards 1020 using 1010 to stabilize and secure the TEC elements 1010 within the TEC box 1000. Upon review of this disclosure, those skilled in the art will appreciate that a plurality of the TEC elements 1010 may be coupled together in a variety of different configurations using various coupling mechanisms.

Figure 11:
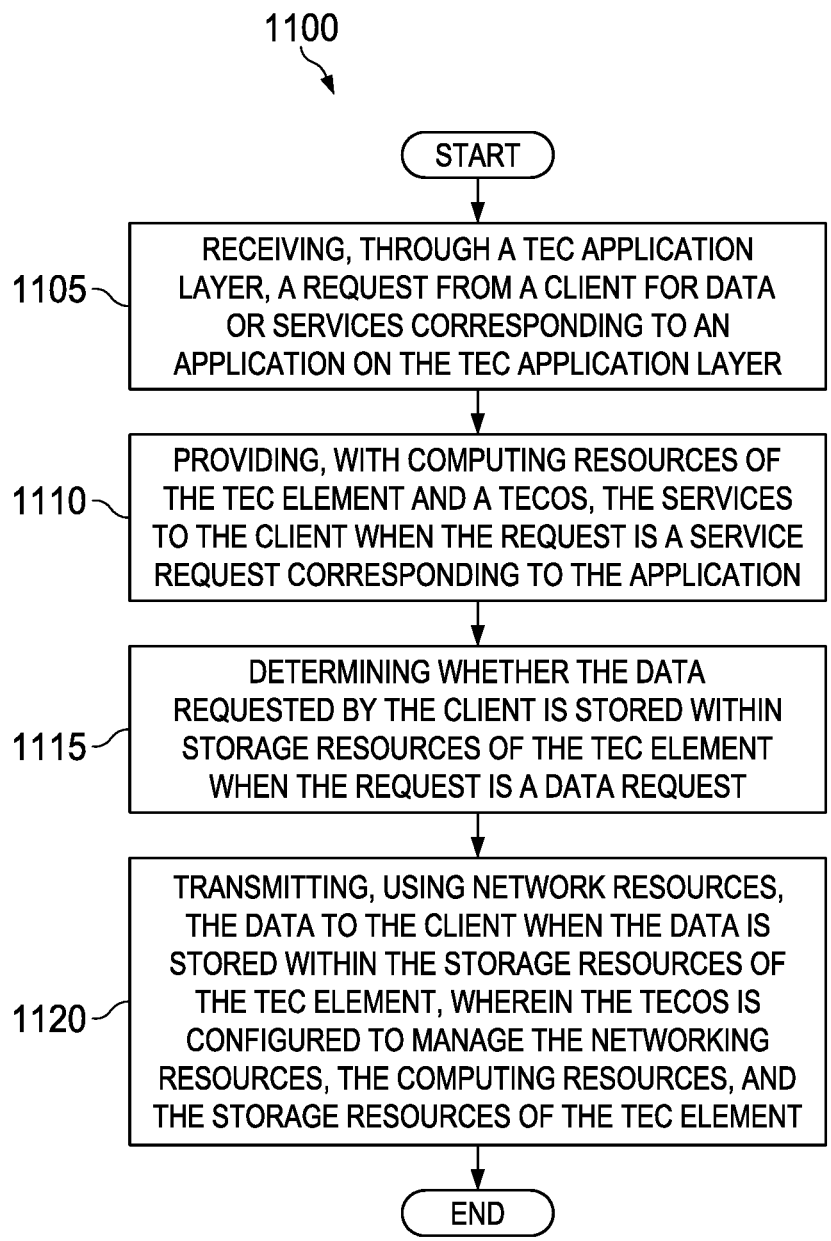
FIG. 11 is a flowchart of an embodiment of a method used by the TEC element to provide data and services to one or more clients.

FIG. 11 is a flowchart of an embodiment of a method 1100 used by a TEC element to provide data and services to clients. The method 1100 is implemented by a TEC element deployed between a client and a packet network. In an embodiment, the TEC element is similar to the TEC elements 206, 300, and 400. In an embodiment, the method 1100 is deployed when a request for data and/or services is received from a client. At block 1105, a request or service order from a client for data or services corresponding to an application on a TEC application layer is received through the TEC application layer. For example, a TEC application layer, such as the TEC application layer 415, of a TEC element, such as the TEC element 206, 300, and 400, receives a request corresponding to an application on the TEC application layer from a client, such as client 224 or 226. At block 1110, the requested services are provided to the client using the computing resources and a TECOS of the TEC element when the request is a service request corresponding to the application. For example, the computing resources, such as the computing resources 420, may be used to provide the requested services to the client. At block 1115, it may be determined whether the data requested by the client is stored within the storage resources of the TEC element when the request is a data request. For example, the TEC element may search the storage resources, such as the storage resources 428, for the requested data. At block 1120, the data may be transmitted using the network resources to the client when the data is stored within the storage resources of the TEC element. For example, the networking resources, such as the networking resources 423, transmit the data that is stored in the storage resources to the client when the requested data is stored in the storage resources. In one embodiment, a TECOS is configured to manage the networking resources, the computing resources, and the storage resources of the TEC element.

In an embodiment, a TEC element deployed between a client and a packet network includes a TEC hardware layer having means for storing, means for networking coupled to the means for storing and comprising input and output means, and means for computing coupled to the means for storing and the means for networking a TECOS coupled to the TEC hardware layer and configured to control and manage the means for storing, the means for networking, and the means for computing, wherein the TECOS is executed by the means for computing; and a TEC application layer coupled to the TECOS, wherein the TEC application layer is configured to process a request from the client using the TECOS, wherein the computing resources are configured to execute cloud applications to provide a service to the client when the request processed by the TEC application layer is a service request, and wherein at least one of the means for networking and the means for storing is configured to provide data to the client when the request comprises a data request.

In an embodiment, an apparatus deployed between a client and a packet network includes storage resources having a means for storing data, wherein the storage resources comprise a memory, networking resources coupled to the storage resources, and computing resources coupled to the networking resources and the storage resources, wherein the computing resources comprise a plurality of processors, wherein a first one of the processors has a means for executing a TECOS configured to manage the storage resources, the networking resources, and the computing resources to provide requested services and data to a client, wherein a second one of the processors has a means for executing a cloud application when a service request associated with the cloud application is received from the client, and wherein the networking resources have a means for providing data to the client from the storage resources when a data request is received from the client and the data is stored in the memory of the storage resources.

In an embodiment, a method implemented by a TEC element deployed between a client and a packet network comprises a means for receiving, through a TEC application layer, a request from a client for data or services corresponding to an application on the TEC application layer, a means for providing, with computing resources of the TEC element and a TECOS, the services to the client when the request is a service request corresponding to the application, a means for determining whether the data requested by the client is stored within storage resources of the TEC element when the request is a data request, and a means for transmitting, using networking resources, the data to the client when the data is stored within the storage resources of the TEC element, wherein the TECOS is configured to manage the networking resources, the computing resources, and the storage resources of the TEC element.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A telecommunications edge cloud (TEC) device, comprising:
   a plurality of TEC hardware components comprising:
      a computing component that includes one or more processors;
      a storage component that includes a memory; and
      a networking component; and
   a TEC operating system (TECOS) stored in the storage component and executed by the computing component, the TECOS comprising:
      an application programming interface (API) configured to provide an interface to:
         allow a first application to access a computing resource;
         allow a second application to access a networking resource; and
         allow a third application to access a storage resource;
      a service manager configured to:
         interact with the first application, the second application and the third application through the API;
         identify the computing resource for the first application;
         identify the networking resource for the second application;
         identify the storage resource for the third application; and
         map the computing resource to the computing component, the networking resource to the networking component, and the storage resource to the storage component; and
      a resource manager configured to manage the computing resource, the networking resource, and the storage resource; and
   an application executed by the computing component and configured to receive a service request from a client, with the application including at least one of the first application, the second application or the third application.

2. The TEC device according to claim 1, wherein the service manager is further configured to provide service orchestration mechanisms to the first application, the second application, and the third application.

3. The TEC device according to claim 1, wherein the service manager is further configured to notify the resource manager of the computing resource, the networking resource, and the storage resource with a notification, wherein the resource manager is further configured to manage the computing resource, the networking resource, and the storage resource based on the notification of the service manager.

4. The TEC device according to claim 1, wherein the resource manager is further configured to perform at least one of allocation, reservation, instantiation, activation, deactivation, or deallocation of the computing resource, the networking resource, and the storage resource.

5. The TEC device according to claim 1, further comprising a fabric component configured to interconnect the computing component, the storage component, and the networking component, and wherein the fabric component is configured to interconnect the TEC device with a second TEC device.

6. The TEC device according to claim 1, wherein the first application comprises at least one of a virtual private cloud (vPC) application, an Internet of Things (IoT) application, or a data analytics application, the second application comprises at least one of an internet access application or a virtual private network (VPN), application and the third application comprises at least one of a content delivery network (CDN) application, the IoT application, or the data analytics application.

7. The TEC device according to claim 1, wherein the API comprises a representational state transfer (REST) or remote procedure call (RPC) API.

8. The TEC device according to claim 1, wherein the computing resource comprises at least one of a virtual machine, a container, a generic server, an application specific integrated circuit (ASIC), or a digital signal processor (DSP).

9. The TEC device according to claim 1, wherein the API is configured to provide the interface for the second application to program a network input and output port.

10. The TEC device according to claim 1, wherein the networking component comprises at least one of a provider edge (PE) router, an optical line terminal (OLT), a broadband network gateway (BNG), a wireless access point equipment, or an optical transport network (OTN) switch.

11. An apparatus, comprising:
   a memory; and
   a processor coupled to the memory and configured to execute an application programming interface (API), a resource manager, and a service manager stored in the memory, wherein:
      the API is configured to:

provide an interface to allow a first application to access a computing resource;
allow a second application to access a networking resource; and
allow a third application to access a storage resource;
the service manager is configured to:
interact with the first application, the second application, and the third application through the API;
identify the computing resource for the first application;
identify the networking resource for the second application;
identify the storage resource for the third application; and
map the computing resource to a computing component, the networking resource to a networking component, and the storage resource to a storage component; and
the resource manager is configured to manage the computing resource, the networking resource, and the storage resource; and
wherein the processor is further configured to execute an application including at least one of the first application, the second application or the third application.

12. The apparatus according to claim 11, wherein the service manager is configured to provide a service orchestration mechanism to the first application, the second application, and the third application.

13. The apparatus according to claim 11, wherein the service manager is further configured to notify the resource manager of the computing resource, the networking resource, and the storage resource with a notification, and wherein the resource manager is further configured to manage the computing resource, the networking resource, and the storage resource based on the notification.

14. The apparatus according to claim 11, wherein the resource manager is configured to perform at least one of allocation, reservation, instantiation, activation, deactivation, or deallocation of the computing resource, the networking resource, and the storage resource.

15. The apparatus according to claim 11, wherein the first application comprises at least one of a virtual private cloud (vPC) application, an Internet of Things (IoT) application, or a data analytics application, the second application comprises at least one of an internet access application or a virtual private network (VPN) application, and the third application comprises at least one of a content delivery network (CDN) application, the IoT application, or the data analytics application.

16. The apparatus according to claim 11, wherein the API comprises a representational state transfer (REST) or remote procedure call (RPC) API.

17. The apparatus according to claim 11, wherein the computing resource comprises at least one of a virtual machine, a container, a generic servers, an application specific integrated circuit (ASIC), or a digital signal processor (DSP).

18. The apparatus according to claim 11, wherein the API is configured to provide the interface for the second application to program a network input and output port.

19. The apparatus according to claim 11, wherein the networking component comprises at least one of a provider edge (PE) router, an optical line terminal (OLT), a broadband network gateway (BNG), a wireless access point equipment, or an optical transport network (OTN) switch.

20. A telecommunications edge cloud (TEC) device, comprising:
a plurality of TEC hardware components comprising:
a computing component that includes one or more processors;
a storage component that includes a memory; and
a networking component; and
a TEC operating system (TECOS) stored in the storage component and executed by the computing component, the TECOS comprising:
an application programming interface (API) configured to provide an interface to allow a cloud application to access at least one of a computing resource, a networking resource, or a storage resource;
a service manager configured to:
interact with the cloud application through the API to identify the computing resource, the networking resource, and the storage resource; and
map the computing resource to the computing component, the networking resource to the networking component, and the storage resource to the storage component; and
a resource manager configured to manage the computing resource, the networking resource, and the storage resource; and
an application executed by the computing component and configured to receive a service request from a client, with the application including the cloud application.

* * * * *